FTP8102 OR 3,838,343

455/5 United States Patent [19] Yactor

[11] 3,838,343

[45] Sept. 24, 1974

[54] BROADBAND CABLE COMMUNICATIONS SYSTEM

[75] Inventor: Richard Yactor, Des Plaines, Ill.

[73] Assignee: Motorola, Inc., Franklin Park, Ill.

[22] Filed: Mar. 15, 1973

[21] Appl. No.: 341,425

[52] U.S. Cl. .................... 325/58, 325/15, 325/61, 340/207 R

[51] Int. Cl. .................... H04b 3/02

[58] Field of Search .............. 325/5, 10, 11, 13, 51, 325/53, 54, 58, 308; 343/175, 176, 177, 179; 340/177 R, 207 R, 209

[56] References Cited

UNITED STATES PATENTS

| | | | |
|---|---|---|---|
| 1,818,669 | 8/1931 | Beckman | 325/54 |
| 2,064,894 | 12/1936 | Espenschied | 325/5 X |
| 2,607,004 | 8/1952 | Harris | 325/8 X |
| 3,041,450 | 6/1962 | Parker | 325/51 |

*Primary Examiner*—Benedict V. Safourek
*Attorney, Agent, or Firm*—Eugene A. Parsons; Vincent J. Rauner

[57] ABSTRACT

Continuously operating injection and carrier oscillators attached to a broadband cable with means for data modulating the carrier oscillator and a transmitter/receiver attached to the cable remotely from the carrier oscillator and including means for picking off the carrier frequency and means for picking off the injection frequency and mixing the two to provide an IF signal which may be demodulated to retrieve the data or modulated by data and transmitted back along the cable for two-way communications.

9 Claims, 1 Drawing Figure

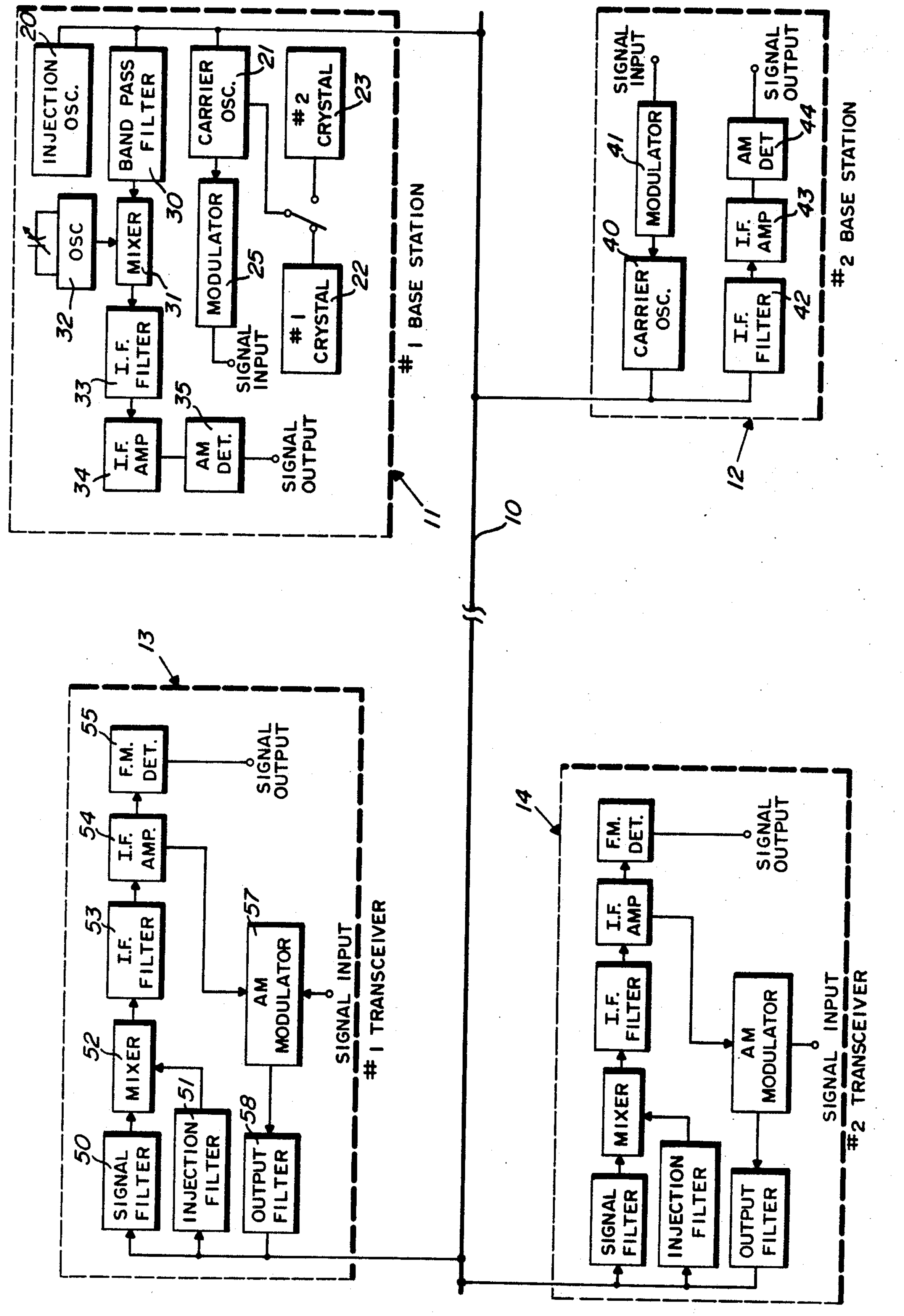
INJECTION OSC.
BAND PASS FILTER
CARRIER OSC.
#2 CRYSTAL
OSC
MIXER
MODULATOR
#1 CRYSTAL
I.F. FILTER
SIGNAL INPUT
I.F. AMP
AM DET.
SIGNAL OUTPUT
#1 BASE STATION
SIGNAL INPUT
SIGNAL OUTPUT
MODULATOR
AM DET
CARRIER OSC.
I.F. AMP
I.F. FILTER
#2 BASE STATION
F.M. DET.
SIGNAL OUTPUT
I.F. AMP.
I.F. FILTER
AM MODULATOR
SIGNAL INPUT
MIXER
SIGNAL FILTER
INJECTION FILTER
OUTPUT FILTER
#1 TRANSCEIVER
F.M. DET.
SIGNAL OUTPUT
I.F. AMP
I.F. FILTER
AM MODULATOR
SIGNAL INPUT
MIXER
SIGNAL FILTER
INJECTION FILTER
OUTPUT FILTER
#2 TRANSCEIVER
10
11
12
13
14
20
21
22
23
25
30
31
32
33
34
35
40
41
42
43
44
50
51
52
53
54
55
57
58

BROADBAND CABLE COMMUNICATIONS SYSTEM

BACKGROUND OF THE INVENTION

1. Field of The Invention

The present system pertains to a two-way communications system and, in particular, to a two-way communications system utilizing a broadband cable as the connecting link. The broadband cable system may be a system already in use for other purposes, such as television, or it may be a cable system installed strictly for use in a two-way communications system.

2. Description of The Prior Art

In prior art cable communications systems the transmitters and receivers are constructed as they are for standard broadcast, except for smaller power requirements. In these prior art systems the stability of each transmitter and receiver is dependent upon the internal oscillators and other components. Therefore, except for power requirements, the equipment is as complicated and costly as standard broadcasting equipment.

SUMMARY OF THE INVENTION

The present invention pertains to a broadband cable communications system utilizing an injection oscillator, which may be located at the head end of the cable or in a base station on the cable, a carrier oscillator at each base station with modulator means for modulating the carrier frequency in accordance with data to be transmitted, and a plurality of remotely located transmitter/receiver units each including means for receiving the carrier and the injection frequencies and mixing the frequencies to provide an IF signal. When the carrier frequency is modulated with data, demodulators in specified ones or all of the transmitter/receiver units strip the data from the carrier frequency and apply it to a transducer, such as a speaker, or other data utilizing devices. When the carrier frequency is not modulated with data by the base station, a substantially continuous carrier and injection frequency are applied to each remotely located transmitter/receiver and the IF signal supplied by the mixer is applied to a modulator having an input for data, which data modulated IF signal may be transmitted along the cable back to the base station for two-way communications.

Since the remotely located transmitter/receiver units do not contain local oscillators and since the entire system relies on the stability of the injection oscillator, the frequency stability thereof is greatly improved. Further, the cost of the entire system is substantially reduced by the elimination of many components.

It is an object of the present invention to provide an improved broadband cable communications system.

It is a further object of the present invention to provide an improved data transmitter/receiver for use in a broadband cable communications system.

It is a further object of the present invention to provide a broadband cable communications system having a substantially higher frequency stability and reduction in overall cost.

These and other objects of this invention will become apparent to those skilled in the art upon consideration of the accompanying specification, claims and drawing.

BRIEF DESCRIPTION OF THE DRAWING

The single FIGURE is a block diagram of an improved broadband cable communications system incorporating an embodiment of a data transmitter/receiver.

DESCRIPTION OF THE PREFERRED EMBODIMENT

In the FIGURE the numeral 10 designates a broadband cable having connected thereto a first base station, generally designated 11, a second base station, generally designated 12, transmitter/receiver units, generally designated 13 and 14. While it should be understood that many cable systems are extremely complicated, utilizing trunk cables, feeder cables, drop cables and various types of amplifiers along the different cables, a single length of cable is illustrated in the present embodiment for simplicity and because those skilled in the art will readily understand the application of the present invention to more complicated cable systems. Further, while base stations 11 and 12 are attached at one end of the cable 10 and transmitter/receiver units 13 and 14 are connected at the other end of the cable 10 in the present embodiment, it should be understood that substantially any desired number of base stations and remote units and dispersement along the cable 10 might be utilized.

In the present embodiment an injection oscillator 20 is incorporated in the first base station 11 and supplies an injection frequency directly to the cable 10. The injection oscillator 20 is constructed to operate substantially continuously so that the injection frequency is available along the cable 10 throughout periods of system operation. It should be understood that the injection oscillator 20 might be coupled to the cable 10 substantially anywhere along the length thereof and is shown in the base station 11 for simplicity and because it would be most logical to incorporate the injection oscillator 20 in one of the base stations.

The first base station 11 further includes a carrier oscillator 21 which is tunable to a first or second frequency by selecting first or second crystals 22 and 23. While two channels or frequencies and specific apparatus for tuning between the two frequencies are illustrated in the present embodiment, it will of course be understood by those skilled in the art that the tunable carrier oscillator 21 could be tunable through any plurality of frequencies and by means of any apparatus desired. A modulator 25 is connected to the carrier oscillator 21 to modulate the carrier frequency in accordance with data supplied to the modulator 25 at a signal input thereto. The data supplied to the signal input can, of course, come from any variety of transducers or other signal producing machines and will depend upon the type of communications desired. The carrier oscillator 21 transmits a continuous signal during operation of the system so that the remote unit tuned to the frequency of the oscillator 21 can communicate with the base station 11, as will be described presently.

The first base station 11 further includes a bandpass filter 30 for receiving return transmissions from the cable 10. The output of the bandpass filter 30 is applied to a mixer 31 which also has a tunable local oscillator 32 attached thereto. The output of the mixer 31 is an IF signal which is applied, through an IF filter 33 and IF amplifier 34 to an AM detector 35. The bandpass filter 30, mixer 31 and tunable local oscillator 32 are utilized in the present receiver so that the frequency of the receiver may be altered to communicate with any of the various remote units. It will of course be understood by those skilled in the art that this is simply one embodiment for communicating with remote units tuned to different frequencies and that other embodiments, such as changing complete channels, might be utilized if desired. Further, while an AM detector 35 is utilized in the present embodiment to demodulate the amplitude modulated transmissions from the remote units, it should be understood that other types of modulation and other types of demodulators may be incorporated if desired. Since the frequency of the carrier oscillator 21 will determine the frequency of the return signal from the remote unit, as well as the specific remote unit with which the base station is communicating, it will be expedient to connect the tuning control of the oscillator 32 to the control of the carrier oscillator 21 so that they are both on the same channel for two-way communication. However, the tuning controls of the oscillators 21 and 32 are not connected in the present embodiment since it may be desirable to monitor other channels without communicating with the units tuned thereto. It will be readily apparent that a variety of equipment and combinations can be devised depending upon the needs and desired use.

Referring to base station 12, an injection oscillator is not incorporated because the injection oscillator 20 will provide the injection frequency for the entire system. If the base station 12 is to be utilized on a different group of channels, for example, a second injection oscillator operating at a different frequency might be utilized. The base station 12 includes a carrier oscillator 40, which is operating continuously at a predetermined frequency and which has a modulator 41 attached thereto for modulating the carrier frequency in accordance with data applied to a signal input therein. The base station 12 further includes an IF filter 42 tuned to a specific return frequency, which will be described in more detail presently, and which frequency is supplied through an IF amplifier 43 to an AM detector 44. The data at the signal output from the AM detector 44 is applied to any desired transducer (not shown) to utilize the data in accordance with the system. The base station 12 incorporates a fixed carrier oscillator 40 and fixed receiver to illustrate the variety of types of equipment that may be utilized in the present system.

The transmitter/receiver units 13 and 14 are similar and, therefore, only the unit 13 will be described in detail. Unit 13 includes a signal filter 50 tuned to the carrier frequency of the particular base station, for example base station 11, with which it is desired to communicate. Unit 13 further includes an injection filter 51 tuned to the injection frequency produced by the injection oscillator 20. The filters 50 and 51 are connected to a mixer 52 which combines the injection and carrier frequencies to provide an intermediate or IF frequency at the output thereof. The mixer 52 provides a standard heterodyne action between the carrier and injection frequencies, and the injection filter 51, which supplies the injection frequency from the cable 10, replaces the local oscillator normally utilized in a heterodyne receiver. The output of the mixer 52 is applied through an IF filter 53 and IF amplifier 54 to an FM detector 55. The data output from the FM detector 55 is applied to signal utilizing devices, such as transducers and the like (not illustrated) which may be connected to the signal output of the detector 55. Because the injection frequency passing through the injection filter 51 remains at a fixed frequency, to alter the frequency of the receiver the tuned frequency of the signal filter 50 and the IF strip (filter 53 and amplifier 54) must be altered.

The unit 13 further includes an AM modulator 57 connected to receive the IF signal from the IF amplifier 54 and having a signal input through which data is supplied for amplitude modulating the IF signal. The output of the modulator 57 is applied through an output filter 58 to the cable 10. Assuming the signal filter 50 and IF filter and amplifier 53 and 54 are tuned to receive the carrier frequency from the carrier oscillator 21 of base station 11 and since the carrier oscillator 21 is maintained in an operating condition substantially continuously, a continuous IF signal is supplied from the amplifier 54 to the modulator 57 for modulation by input data. The modulated IF signal transmitted by unit 13 is received by the receiver at base station 11 to provide two-way communications.

Thus, a communications system for use with a broadband cable is illustrated and disclosed. The system includes remote units which depend upon oscillators at the base station for operation and, therefore, are as stable as the oscillators at the base station. Since the remote units do not contain local oscillators they are less expensive to manufacture and the single injection oscillator in the system can be constructed with the frequency stability necessary for the overall system.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Data transmitter/receiver for a broadband cable communications system comprising:

a. signal receiving means coupled to the cable for picking off a carrier frequency from the cable;

b. injection frequency receiving means coupled to the cable for picking off an injection frequency from the cable;

c. mixer means connected to receive the carrier frequency from the signal receiving means and the injection frequency from the injection frequency receiving means and providing an IF signal;

d. demodulating means connected to receive the IF signal from said mixer means and provide a data output signal in response to a data modulated carrier frequency received by said signal receiving means; and e. modulating means connected to receive the IF signal from said mixer means and having a data input for modulating the IF signal in accordance with data applied to said data input, said modulating means being coupled to the cable for transmitting the modulated IF signal along the cable.

2. Data transmitter/receiver for a broadband cable communications system as claimed in claim 1 wherein each of the signal receiving means, the injection frequency receiving means and the modulating means are coupled to the cable by filter means tuned to the carrier frequency, the injection frequency and the IF signal, respectively.

3. Data transmitter/receiver for a broadband cable communications system as claimed in claim 1 wherein the demodulating means includes an FM detector.

4. Data transmitter/receiver for a broadband cable communications system as claimed in claim 1 wherein the modulating means includes an AM modulator.

5. A broadband cable communications system comprising:

a. injection oscillator means coupled to the cable for providing a substantially continuous injection frequency on the cable;

b. carrier oscillator means coupled to the cable for providing a substantially continuous carrier frequency on the cable;

c. modulator means coupled to said carrier oscillator means and having a data input for modulating the carrier frequency with data; and d. a data transmitter/receiver located remotely from said carrier oscillator and including signal receiving means coupled to the cable for picking off the carrier frequency from the cable, injection frequency receiving means coupled to the cable for picking off the injection frequency from the cable, mixer means connected to the signal receiving means and the injection frequency receiving means for providing an IF signal in response thereto;

demodulating means connected to receive the IF signal from said mixer means and provide a data output signal in response to a data modulated carrier frequency received by said signal receiving means, and modulating means connected to said mixer means and having a data input for modulating the IF signal in accordance with data applied to said data input, said modulating means being coupled to the cable for transmitting the modulated IF signal along the cable.

6. A broadband cable communications system as claimed in claim 5 including in addition means associated with the carrier oscillator means for receiving and demodulating the modulated IF signal to provide two-way communications.

7. A broadband cable communications system as claimed in claim 6 wherein the receiving and demodulating means includes mixing means and a tunable oscillator connected thereto for receiving IF signals with a plurality of different frequencies.

8. A broadband cable communications system as claimed in claim 5 wherein the carrier oscillator means includes means for changing the frequency supplied thereby for communicating with data transmitter/receivers having signal receiving means tuned to different carrier frequencies.

9. A broadband cable communications system comprising:

a. a broadband cable;

b. injection oscillator means coupled to said cable for providing a substantially continuous injection frequency on said cable;

c. carrier oscillator means coupled to said cable for providing a substantially continuous carrier frequency on said cable;

d. modulator means coupled to said carrier oscillator means and having a data input for modulating the carrier frequency with data; and e. a data transmitter/receiver located remotely from said carrier oscillator adjacent said cable and including signal receiving means coupled to said cable for picking off the carrier frequency therefrom, injection frequency receiving means coupled to said cable for picking off the injection frequency therefrom, mixer means connected to the signal receiving means and the injection frequency receiving means for providing an IF signal in response thereto, and demodulating means connected to receive the IF signal from said mixer means and provide a data output signal in response to a data modulated carrier frequency received by said signal receiving means.

* * * * *